No. 613,697. Patented Nov. 8, 1898.
G. T. MARTIN.
BICYCLE GEAR.
(Application filed Aug. 31, 1897.)
(No Model.) 2 Sheets—Sheet 1.

Witnesses
W. G. McMillan
A. J. Colbourne.

Inventor
Geo. T. Martin
by Ridout & Maybee
attys

No. 613,697. Patented Nov. 8, 1898.
G. T. MARTIN.
BICYCLE GEAR.
(Application filed Aug. 31, 1897.)

(No Model.) 2 Sheets—Sheet 2.

Witnesses
W. J. McMillan
A. J. Colbourne.

Inventor
Geo. T. Martin
by
Ridout & Maybee
Attys.

UNITED STATES PATENT OFFICE.

GEORGE T. MARTIN, OF SMITH'S FALLS, CANADA.

BICYCLE-GEAR.

SPECIFICATION forming part of Letters Patent No. 613,697, dated November 8, 1898.

Application filed August 31, 1897. Serial No. 650,183. (No model.)

*To all whom it may concern:*

Be it known that I, GEORGE THOMAS MARTIN, architect, of the town of Smith's Falls, in the county of Lanark and Province of Ontario, Canada, have invented a certain new and Improved Bicycle-Gear, of which the following is a specification.

The object of the invention is to provide a bicycle-gear which is compact in form and simple in construction, whereby great speed may be imparted to the sprocket-chain wheel without undue expenditure of power; and it consists in the peculiar construction, arrangement, and combinations of parts hereinafter more fully described and then definitely claimed.

Figure 1:
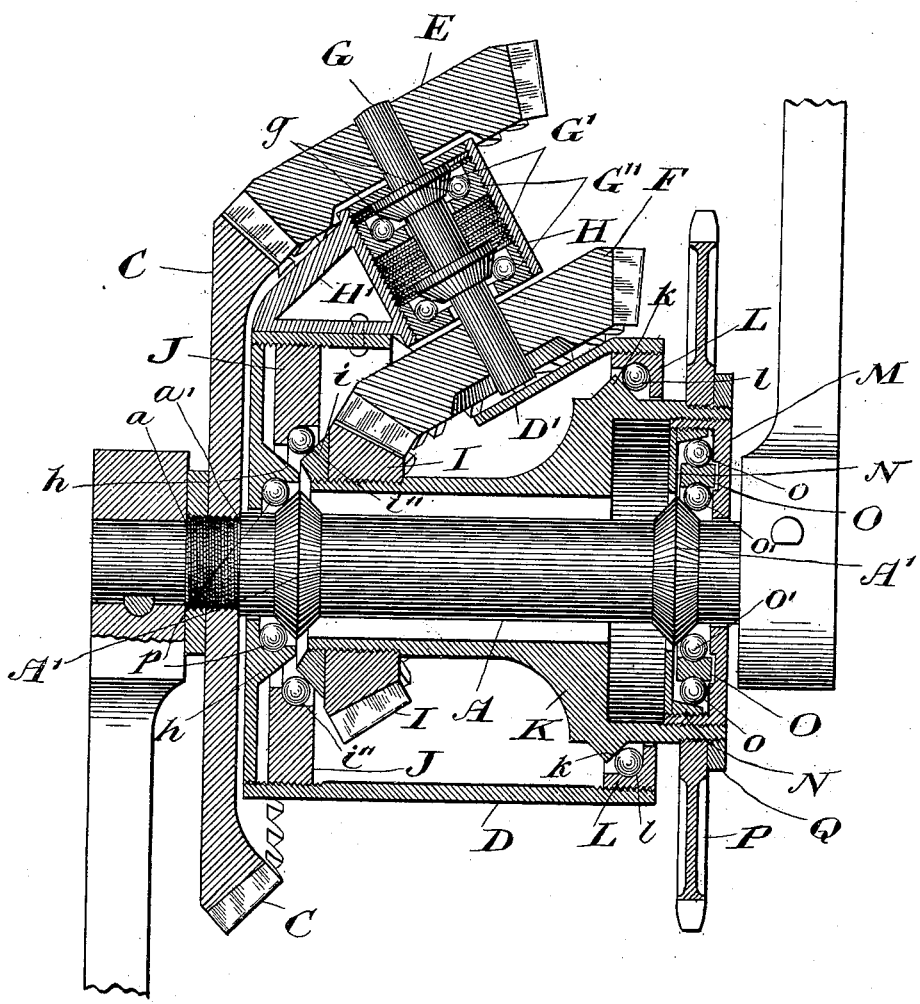
Figure 2:
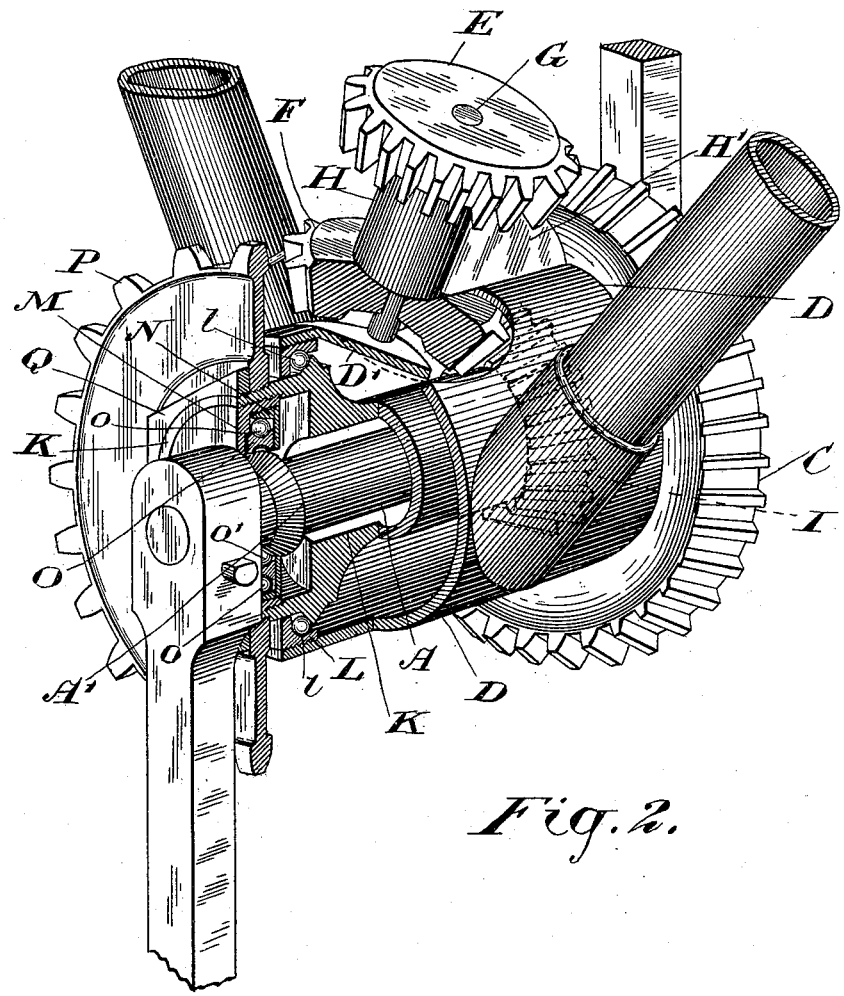

In the accompanying drawings, Figure 1 is a sectional elevation of my improved gear. Fig. 2 is a perspective view, partly broken away, the device being turned end for end as compared with Fig. 1.

In the drawings like letters of reference indicate corresponding parts in both figures.

In both figures, A is a pedal-shaft provided toward either end with the ball-bearing cones A' and shouldered preferably at $a$ $a'$, so that the parts may be held more securely.

C is a bevel gear-wheel which is screwed on or otherwise fixed to the pedal-shaft near the end opposite to that on which the chain sprocket-wheel is located.

B is a housing which is preferably cylindrical in form, as indicated in Fig. 2, and which is secured to the seat-stem and diagonal brace of the bicycle-frame in the manner indicated. This housing D has an aperture cut therein for the purpose of permitting the gear-wheel F, hereinafter referred to, to pass through, and it is provided with the strengthening-flap D', which serves to prevent any undue buckling of the housing.

E and F are bevel gear-wheels, the gear-wheel F being shown broken away in Fig. 2, so as to indicate the opening in the housing and the strengthening-flap D' referred to.

G is a gear-wheel shaft provided with ball-bearing cones G'. It is carried in the bearing-box H, which is preferably secured to the housing by the bracket H'.

G'' are grooved rings which are screwed within the bearing-box H and which constitute, with the cones G', a raceway for the balls $g$.

I is a bevel gear-wheel meshing with the bevel gear-wheel F. This gear-wheel I is screwed onto or otherwise secured to the sleeve K, and it is provided with a shoulder $i$, formed on or secured thereto. This bevel gear-wheel I is shown in dotted lines in Fig. 2.

J is a grooved ring which is screwed into the housing and forms with the shoulder $i$ a raceway for the balls $i''$, which carry one end of the sleeve K and the bevel gear-wheel I. The sleeve K is preferably shaped as indicated in the drawings and is provided with a shoulder or ball-bearing cone $k$, which, together with the grooved ring L, which is screwed into the housing, forms a raceway for the balls $l$, which help to carry the other end of the sleeve K.

M is a ball-bearing cup which is screwed within the sleeve K, sleeved on the pedal-shaft.

N is a shouldered ring which is screwed into the ball-bearing cup M and which is adjustable on the balls $o$ $o'$.

O is a grooved-ring diaphragm separating the series of balls $o$ $o'$ and makes up with the ball-bearing cup M, the cone A', and the shouldered ring N a raceway for the balls.

P is a sprocket-chain wheel which is screwed on or otherwise rigidly secured to the sleeve K, which is sleeved on the pedal-shaft.

Q is a nut screwed onto the outer face of the threaded sleeve K to hold the sprocket-chain wheel P in place. There is a small grooved shoulder $h$ formed on the housing, which, with the ball-bearing cones A' on the pedal-shaft, makes a raceway for the balls $p$.

I have thus indicated a system of ball-bearings which I consider preferable, though other arrangements of the ball-bearings for the several parts may be substituted without departing from the spirit of my invention.

It will thus be seen that I have provided a bicycle-gear which is compact in form and which may be capable of variation as to the gearing up or gearing down of the bicycle by altering the proportions of the various gear-wheels and parts. It is compact in form and may be further protected from dust and dirt by a supplementary casing. By utilizing this form of construction great speed may be attained without undue expenditure of power.

What I claim as my invention is—

1. In a device of the class specified, the combination of a housing D suitably secured to the frame and having grooved rings J and L therein; a sleeve K located within said housing and running on balls supported by said rings J and L; a sprocket-wheel supported on and near one end of said sleeve, and a bevel gear-wheel I secured on and near the other end of said sleeve, and within said housing; a pedal-shaft passing through said sleeve and having one of its ends supported on balls directly in the housing and beyond the sleeve and its opposite end by balls supported by said sleeve; a bevel gear-wheel C fixed to and revolving with said pedal-shaft, and gearing intermediate of said bevel gear-wheels C and I, substantially as described.

2. In a device of the class specified, the combination with the pedal-shaft A, journaled on ball-bearings within the housing D, of the bevel gear-wheel E, the bevel gear-wheel C, meshing therewith, the shaft G carrying said wheel C, journaled on ball-bearings within the bearing-box H, which is secured to the housing D; the bevel gear-wheel F, carried on the other end of the shaft G, and operating through an opening cut in the housing D; the bevel gear-wheel I, meshing with the bevel gear-wheel F, secured to the sleeve K, and provided with ball-bearings; the said sleeve K, provided with ball-bearings and sleeved on the pedal-shaft and the sprocket-chain wheel P, mounted on and secured to the sleeve, substantially as specified.

3. In a device of the class specified, the combination of a housing D suitably secured to the frame; grooved rings J and L near the opposite ends of said housing; a sleeve K located within said housing and running on balls supported by said rings J and L; a sprocket-wheel supported on one end of said sleeve outside of said housing, and a bevel gear-wheel I secured on the other end of said sleeve and within the housing; a pedal-shaft passing through the sleeve K and having one of its ends supported on balls directly in the housing and beyond the sleeve and its opposite end by balls supported by said sleeve; a bevel gear-wheel C fixed to and revolving with said pedal-shaft on the outside of said housing and on the side opposite the sprocket-wheel; and gearing intermediate of said bevel gear-wheels C and I; substantially as described.

4. In a device of the class specified, the combination of a housing D suitably secured to the frame; grooved rings J and L at opposite ends of said housing; a sleeve K located within the housing and running on balls supported on said grooved rings J and L; a sprocket-wheel supported on one end of said sleeve outside of said housing, and a bevel gear-wheel I on the other end and within the housing; a pedal-shaft passing through the sleeve K and having one of its ends supported on balls directly in the housing and beyond the sleeve and its opposite end by balls supported by said sleeve and having interposed between it and said shaft, the shouldered ring N, balls o' and grooved ring O separating said balls; a bevel gear-wheel C fixed to and revolving with said shaft on the outside of said housing and on the side opposite the sprocket-wheel; and gearing intermediate of said bevel gear-wheel C and said bevel gear-wheel I; substantially as described.

Toronto, August 26, 1897.

GEORGE T. MARTIN.

In presence of—
A. M. NEFF,
W. G. McMILLAN.